United States Patent [19]

Pong et al.

[11] Patent Number: 5,380,027

[45] Date of Patent: Jan. 10, 1995

[54] BICYCLE HEADSET

[75] Inventors: Alex Pong, Langley; Skooks Pong, Freeland, both of Wash.

[73] Assignee: Cannondale Corporation, Georgetown, Conn.

[21] Appl. No.: 122,097

[22] Filed: Sep. 16, 1993

[51] Int. Cl.[6] .................... B62K 19/32; B62K 21/06
[52] U.S. Cl. .................................................. 280/279
[58] Field of Search ............... 280/279, 280, 288.4, 280/274; 74/551.1

[56] References Cited

U.S. PATENT DOCUMENTS 1,645,409  10/1927  Weyers ............................. 280/279

FOREIGN PATENT DOCUMENTS 1556994  4/1990  U.S.S.R. ............................. 280/280

Primary Examiner—Eric D. Culbreth
Assistant Examiner—Kevin Hurley
Attorney, Agent, or Firm—Brumbaugh, Graves, Donohue & Raymond

[57] ABSTRACT

A bicycle comprises a frame having a sleeve portion adapted to support a headset assembly and having an annular opening having its axis located substantially in a vertical-longitudinal center plane of the bicycle. The opening has an internal bearing seat surface that supports the outer race of a thin wall large diameter angular contact bearing. A handlebar support member and a front wheel-mounting leg member are joined end to end at a juncture proximate to the bearing by removable fasteners. One of the members has an external bearing seat surface receiving an inner race of the bearing such that the joined members are rotatable within the sleeve.

8 Claims, 2 Drawing Sheets

BICYCLE HEADSET

BACKGROUND OF THE INVENTION

In most bicycles, the front wheel is mounted on an axle that extends transversely between the distal ends of a pair of fork legs. The fork legs are joined at their upper ends by a crown, and a steering tube extending up from the crown is received in a headset, by which the fork is joined to the frame for steering rotation. The headset includes upper and lower ball bearings supported within in a head tube of the frame and supporting the steering tube within them. The handlebar post is received within the steering tube and is affixed to it, usually by a cam type locking mechanism.

Ordinary ball bearings carry loads that act perpendicularly to the axis of rotation of the shaft. Accordingly, torques applied to a shaft mounted in them in a directions tending to skew the shaft resolve as forces on the bearings that are a function of the distance between the bearings. The diameter of the bearings is of little consequence to the bearing loads due to torques on the shaft tending to skew it. In conventional headset designs, therefore, it is suitable to have a head tube of a relatively small diameter. On the other hand, the axial length of the head tube and the axial spacing of the headset bearings should be as large as possible to carry lateral torque loads on the steering tube but are in practice limited by the bicycle size and geometry and are generally small. Accordingly, bearing loads due to cocking of the steering tube within the headset bearings under steering loads, braking loads, and bumps to the front wheel are high.

SUMMARY OF THE INVENTION

One object of the present invention is to provide a bicycle having a headset assembly that is strong and stiff and, therefore, is durable and resists large torques due to steering and braking forces and forces due to the wheel hitting bumps and resists deflections due to those loads. Another object is to provide a headset assembly that is of simple construction, of low cost, light in weight, and easy to assemble and disassemble.

There is provided, in accordance with the present invention, a bicycle comprising a frame having a sleeve portion adapted to support a headset assembly and having an annular opening with an axis located substantially in a vertical-longitudinal center plane of the bicycle. The opening in the sleeve portion has an internal bearing seat surface that receives the outer race of a thin wall large diameter angular contact bearing. A handlebar support member and a front wheel-mounting leg member are joined end to end at a juncture proximate to the bearing by removable fasteners. One of the members has an external bearing seat surface receiving an inner race of the bearing.

In preferred embodiments, the bearing seat for the inner race is on a flange portion of the wheel-mounting leg member, and the handlebar support member has a base portion that engages a free edge of the flange portion. The members are joined by screws that pass through holes in the base portion of the handlebar support member into threaded holes in the flange of the wheel-mounting leg member. Advantageously, the base portion of the handlebar support member includes a plate portion that is substantially coextensive with the flange portion of the wheel-mounting leg member so as to strengthen the flange portion. The handlebar support member and the wheel-mounting leg member may be monocoques. The wheel-mounting leg member may have a single leg portion having a distal end on which the wheel is mounted.

Reduced bearing loads and greater stability and durability are provided by the use of thin wall large diameter angular contact bearings. As used throughout the present specification, the term "thin wall large diameter angular contact bearing" refers to the following specific bearing types: a pair of axially spaced apart large diameter thin section angular contact ball bearings; a single large diameter thin section four point split inner race ball bearing; and a single large diameter thin section crossed roller bearing. A thin wall large diameter angular contact bearing resolves torque loads tending to skew the supported member along vectors oblique to the axis of rotation of the member, and thus the bearing loads due to such skewing torques are considerably reduced, as compared with ordinary ball bearings. The sizes of the member supporting the bearing and the member supported by the bearing can be small in the direction of the axis of rotation. The large diameters of the members makes them stiff and strong.

For a better understanding of the invention, reference may be made to the following description of an exemplary embodiment, taken in conjunction with the accompanying drawings.

DESCRIPTION OF THE EMBODIMENT

The bicycle shown in FIG. 1 incorporates several highly unique features, which include those described and shown in the following patent applications that are filed concurrently with the present application and that are hereby incorporated by reference into the present specification:

Ser. No. 08/122,140, entitled "Monocoque Bicycle Wheel";

Ser. No. 08/122,142, entitled "Bicycle With Trailing Arm Wheel Suspensions";

Ser. No. 08/122,143, entitled "Bicycle Wheel Mount";

Ser. No. 08/122,147, entitled "Bicycle Bottom Bracket/Crank Assembly"; and

Ser. No. 08/122,098, entitled "Bicycle Frame."

Figure 1:
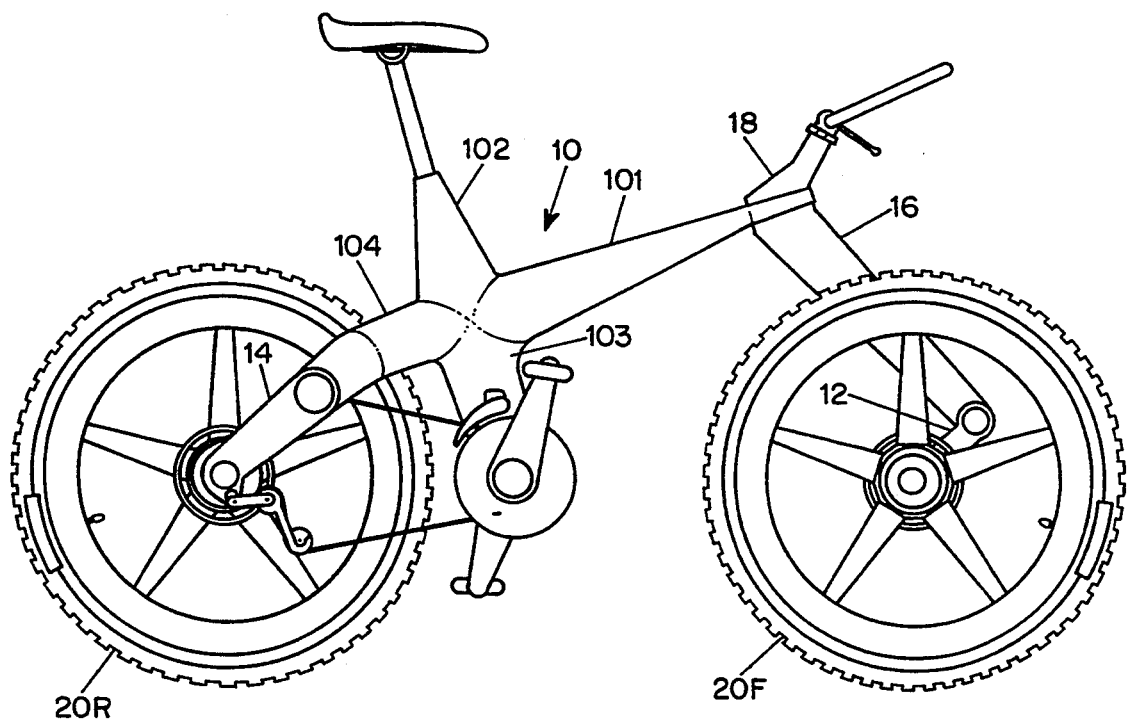
FIG. 1 is a side elevational view of a bicycle equipped with an embodiment of the bottom bracket assembly.

Many of the structural components of the bicycle of FIG. 1 are of monocoque construction, including the frame 10, the swing arms 12 and 14 of the trailing arm wheel suspensions, the front wheel-mounting arm member 16, and the handlebar support member 18, which is affixed to the wheel-mounting arm member 16 and rotatably mounted in a sleeve portion at the front of the frame 10 by the headset assembly of the present invention. The frame is generally "t"-shaped (the "t" being oriented sideways to present an inclined front leg portion 101, a seat support arm portion 102, a bottom bracket/crank support arm portion 103 and a short, bent rear leg portion 104, to which the rear swing arm 14 is attached. Unlike conventional bicycles, in which the wheels are carried on axles extending between members that straddle the wheels (front fork legs and rear triangles), the front and rear wheels 20F and 20R (which are preferably identical) are mounted on one side of the respective swing arms 12 and 14, which permits them to be removed and replaced laterally rather than vertically. The monocoque form of the structural components of the bicycle makes them strong and rigid but permits them to be of light weight. The headset of the invention can readily be used in bicycle having other forms of frames and other structural members and with a front wheel-mounting member having a pair of legs straddling the wheel.

Another aspect of the construction of the bicycle of FIG. 1 is the use of thin wall large diameter angular contact bearings in all pivot connections and journals, including the steering headset of the present invention, wheel journals, swing arms of the trailing arm suspensions, and the bottom bracket assembly. As discussed above, those bearings allow large moments to be applied to the supported members with low bearing loads due to lateral torques applied to the supported members, occupy a minimum of space, increase efficiency, and enhance stability and durability, as compared with the multiple bearing sets within relatively long sleeves that are used in conventional headsets, bottom brackets and wheel journals.

Figure 2:
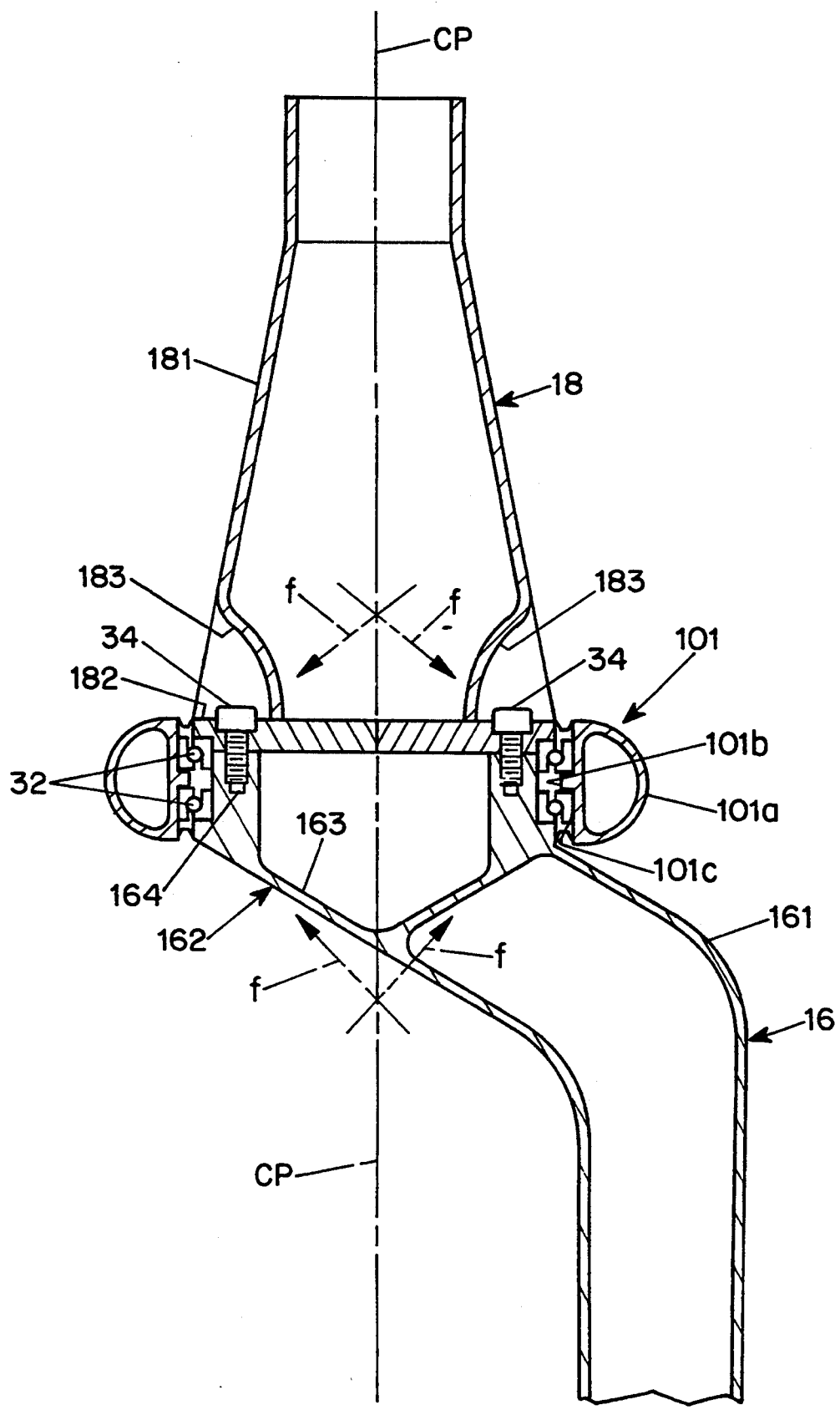
FIG. 2 is a front cross-sectional view of an embodiment of the headset assembly, taken along the axis of rotation of the wheel-mounting arm member.

The front leg portion 101 of the frame 10 has a sleeve portion 101a that supports a headset assembly 30 and that has an opening 102b having its axis lying in a vertical-longitudinal center plane CP of the bicycle. A pair of axially spaced apart large diameter thin section angular contact ball bearings 32 is mounted on an inner circular cylindrical bearing seat surface 101c of the sleeve 101a. As mentioned above, the bearings 32 may be replaced by a single large diameter thin section four point split inner race ball bearing or a single large diameter thin section crossed roller bearing. Also as mentioned above, a characteristic of the angular contact bearings is that the forces applied to them resulting from torques applied to the supported member tending to skew the supported member resolve at angles, as shown by the force lines f in FIG. 2. The greater the diameter of the bearing, the lower the forces due to skewing torques. Thus, the use of large diameter thin section angular contact bearings enable reductions in bearing loads due to skewing torques, as compared to previously known headset assemblies that have plain ball bearing sets and axial thrust bearings.

The handlebar support member 18 and wheel-mounting arm member of the embodiment are monocoques and can be made in various ways. For example, they may be made by forming two lateral half members, such as by casting, press-forming, machining or a combination of working processes, and may have stiffening ribs and varying wall thicknesses. The half sections are joined along mating edges by adhesive, mechanical or thermal connections. The members may include an internal longitudinal spar and a multiplicity of internal ribs joined to the spar, the stressed skin being joined to the spar and ribs.

The handlebar support member includes a stem portion 181 and a base-plate portion 182. Insets 183 in the stem portion adjacent the base-plate portion permit the installation of fasteners 34, such as Allen head cap screws, in holes near the perimeter of the base plate portion. The wheel-mounting arm member 16 includes an arm portion 161, which is offset from the bicycle center plane CP, and a cup-like mounting portion 162 having a conical bottom wall 163 and an annular flange 164 extending upwardly from the bottom wall. The external surface of the flange 164 is a bearing seat, which receives the outer races of the bearings 32. The screws 34 are threaded into holes in the flange 164. The juncture between the base-plate portion of the support arm 18 and the flange 164 is located so that when the screws 34 are removed and the members separated, the bearings can be removed. At assembly, the bearings are set in place within the sleeve 101a, the members 16 and 18 are fitted together in the opening 102b, and the screws 34 are installed. The juncture and connection between the handlebar support and the wheel mounting member can be located anywhere within the sleeve portion, and the inner seat for the bearings can be on either member or partly on both members 16 and 18. The plate portion 162 strengthens and stiffens the flange 164.

We claim:

1. A bicycle comprising a frame having a sleeve portion adapted to support a headset assembly and having an annular opening having an axis located substantially in a vertical-longitudinal center plane of the bicycle, the opening having an internal bearing seat surface, a thin wall large diameter angular contact bearing having an outer race received on the internal bearing seat surface of the opening, a handlebar support member, a front wheel-mounting leg member, the handlebar support member and front wheel-mounting leg member having ends abutting each other, removable fasteners connecting the front wheel-mounting leg member to the handlebar support member, at least one of the handlebar support member and the front wheel-mounting leg member having an external bearing seat surface receiving an inner race of the thin wall large diameter angular contact bearing.

2. A bicycle according to claim 1 wherein the external bearing seat surface of said at least one of the handlebar support member and the front wheel-mounting leg member is on a portion of said at least one of the handlebar support member and the front wheel-mounting leg member that is tubular and substantially coextensive with the annular opening of the sleeve portion of the frame.

3. A bicycle according to claim 2 wherein said at least one of the handlebar support member and the front wheel-mounting leg member is the front wheel-mounting leg member and the tubular portion is a flange portion, and wherein the handlebar support member has a base portion that engages a free edge of the flange portion.

4. A bicycle according to claim 3 wherein the removable fasteners are screws that pass through holes in the base portion of the handlebar support member into threaded holes in the front wheel-mounting leg member.

5. A bicycle according to claim 4 wherein the base portion of the handlebar support member includes a plate portion that is substantially coextensive with the flange portion of the front wheel-mounting leg member so as to strengthen the flange portion.

6. A bicycle according to claim 1 wherein the handlebar support member is a monocoque.

7. A bicycle according to claim 1 wherein the front wheel-mounting leg member is a monocoque.

8. A bicycle according to claim 1 wherein the front wheel-mounting leg member has a single leg portion having a distal end, and further comprising a front wheel mounted on the distal end of the leg portion.

* * * * *